April 15, 1924.　　　　　　　　　　　　　　　　　　1,490,486
C. SCHENCK
METAL WHEEL
Filed Nov. 28, 1919　　　2 Sheets-Sheet 1
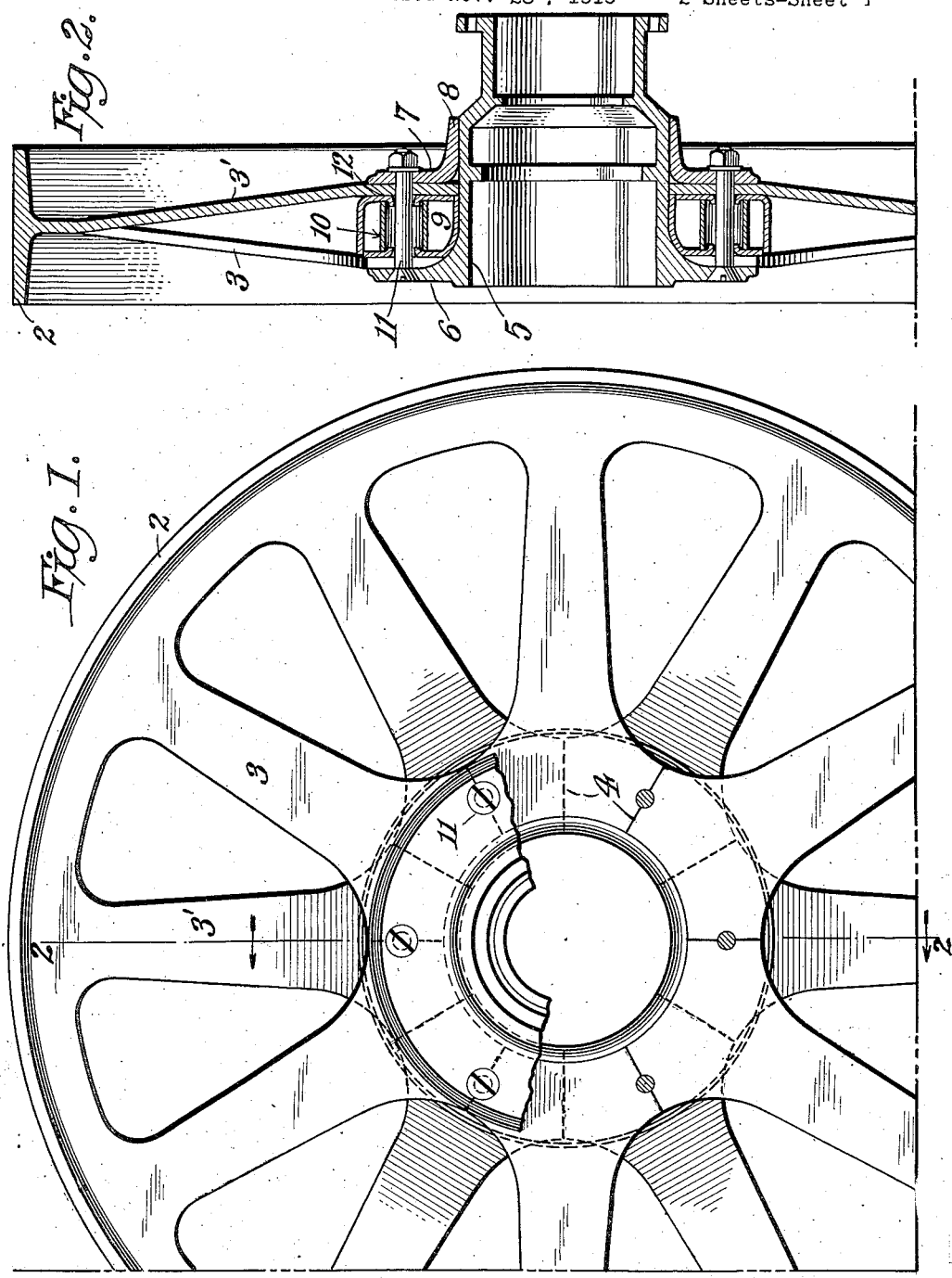

April 15, 1924. 1,490,486
C. SCHENCK
METAL WHEEL
Filed Nov. 28, 1919  2 Sheets-Sheet 2
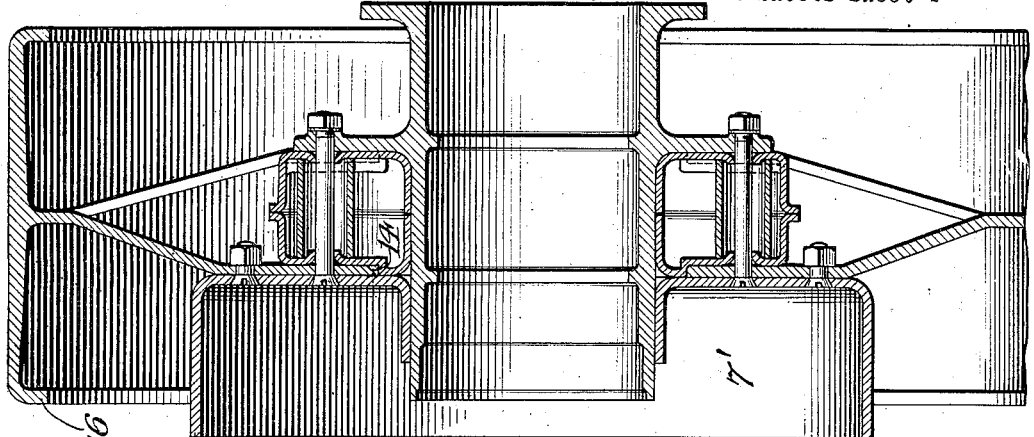
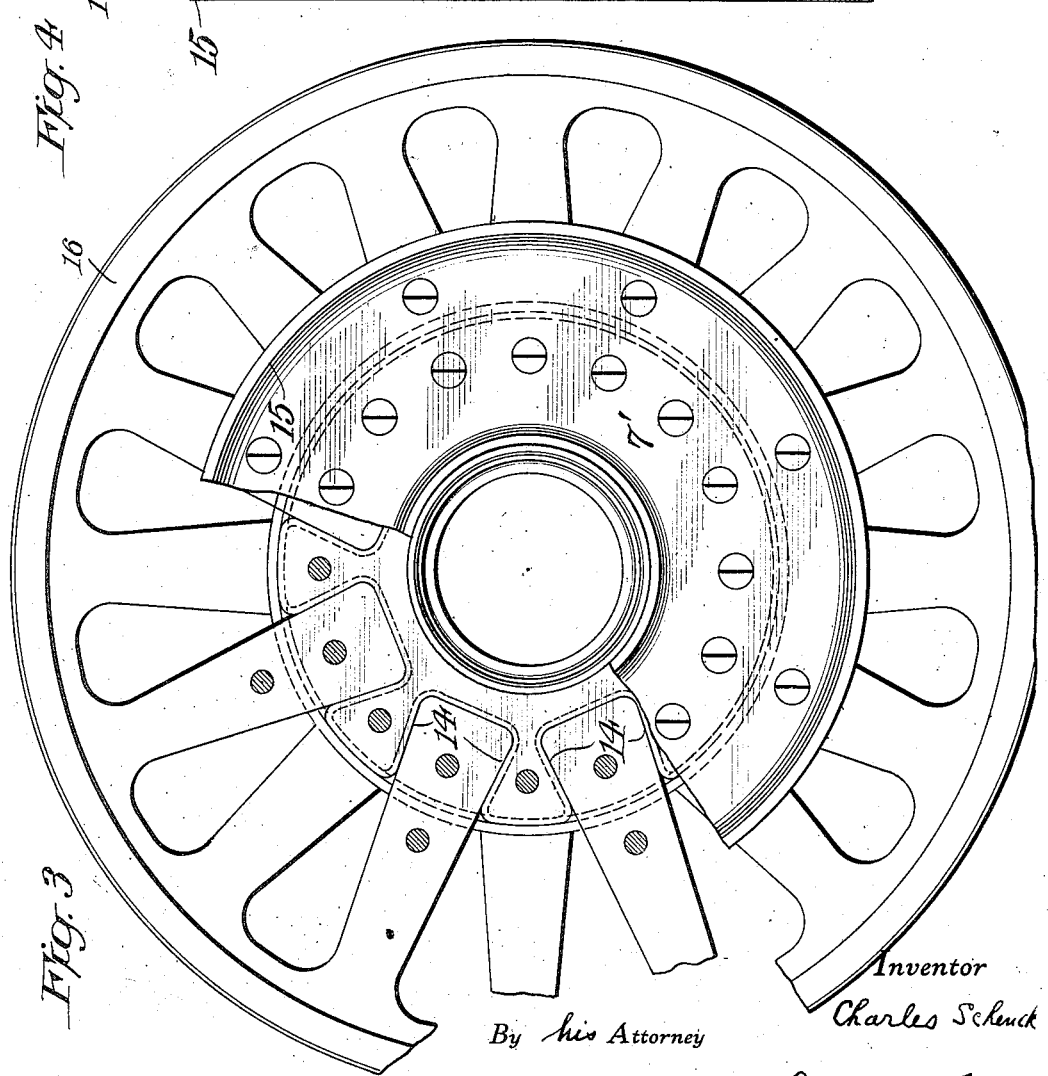
Inventor
Charles Schenck
Clarence D Kerr
By his Attorney Patented Apr. 15, 1924.

1,490,486

UNITED STATES PATENT OFFICE.

CHARLES SCHENCK, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

METAL WHEEL.

Application filed November 28, 1919. Serial No. 341,062.

*To all whom it may concern:*

Be it known that I, CHARLES SCHENCK, a citizen of the United States, residing at Bethlehem, Northampton County, Pennsylvania, have invented new and useful Improvements in Metal Wheels, of which the following is a specification, reference being had to the accompanying drawings, in which—

Fig. 1 is an elevation of a metal wheel embodying my invention; Fig. 2 is a section thereof on line 2—2 of Fig. 1; Fig. 3 is an elevation of a modification of my invention and Fig. 4 is a section thereof.

My invention relates to hubs for metal wheels in which the rim and spokes are preferably formed, respectively, from a flange and the web of a bar or beam. In hubs made in accordance with my invention the hub parts are drawn in upon the spoke portions of the wheel by clamping means. My invention also consists in the construction and arrangement of parts which I shall hereinafter describe and claim.

Referring to the drawings, I have shown a wheel preferably made from a metal beam or bar in which the rim 2 and spokes 3, 3' are formed, respectively, from the flange and web of a beam or bar cut and bent into the shape of a wheel and with the web portions bent alternately to form staggered spokes, and so arranged that the web or spoke portions are preferably in side contact on their edges 4 in the area of the hub, and comprise two sets of spokes 3 and 3'.

The hub comprises the main or interior hub member 5, which has an exterior annular projection 6, and a supplementary or exterior hub member 7 in parallel spaced relation to the projection 6, and which has a flange 8 engaging the periphery of the interior hub member 5.

One set 3 of spokes bears against the inner face of the projection 6, and the other set 3' against the inner face of the exterior hub member 8, and both sets are secured, preferably by bolts 11, to the respective hub members 5 and 7.

Between the sets of spokes is placed a spacer 9 which, with the bolt sleeves 10 contained therein, serves to maintain the sets of spokes a proper distance apart. The projection 6, spokes 3, 3', spacer 9 and exterior member 7 are apertured for the reception of the bolts 11 which serve to draw the parts of the hub together. The bolt sleeves 10, which are held in position by the inwardly turned lips 12 of the spacer, act as stops and prevent undue pressure from being exerted upon the spacer 9. If desired, the spokes may be spot welded to the spacer 9.

In Figs. 3 and 4 I have shown a modified form of my invention particularly designed for use with the rear wheels of trucks, in which the spacer is provided with pockets 14 for the inner ends of the spokes, and the exterior hub member 7' has an annular surface 15 designed for use as a brake drum. The edges 16 of the rim may also be bent down toward the hub to afford additional strength.

Wheels made in accordance with my invention are very strong and durable, and at the same time are comparatively light, owing to the simple hub construction employed.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a metal wheel, a peripheral portion flanged at an angle to the axis of the wheel having two sets of intercalated spokes attached thereto and arranged in staggered relation to each other, a hub having an annular flange on the periphery thereof, an exterior hub member movable over the hub toward the said flange, an annular spoke spacing member encircling the hub between the flange and the exterior hub member, the spoke ends of one set being in side engagement with the inner face of the flange and a face of the spoke spacing member and the spoke ends of the other set being in side engagement with the inner face of the exterior hub member and a face of the spoke spacing member, and bolts for drawing the hub members together to hold the said faces firmly against the sides of the spoke ends, said spokes being structurally interconnected at their inner ends solely through their frictional engagement with said spacer and said hub members, whereby the bolts are relieved substantially of shearing stresses.

2. In a metal wheel, a peripheral portion flanged at an angle to the axis of the wheel having two sets of intercalated spokes attached thereto and arranged in staggered relation to each other, a hub having an annular flange on the periphery thereof, an exterior hub member movable over the hub toward the said flange, an annular spoke spacing member encircling the hub between the flange and the exterior hub member and having depressions in each side thereof for the reception of the spoke ends of the respective sets, and means for drawing the flange and exterior hub member toward each other to bring these parts and the spoke spacing member into firm and frictional engagement with the exterior sides of the spoke ends seated in said slots.

3. In a metal wheel, a peripheral portion flanged at an angle to the axis of the wheel having two sets of intercalated spokes attached thereto and arranged in staggered relation to each other, a hub having an annular flange on the periphery thereof, an exterior hub member movable over the hub toward the said flange, an annular spoke spacing member encircling the hub between the flange and the exterior hub member and having depressions in each side thereof for the reception of the spoke ends of the respective sets, the said depressions having sides which converge toward the periphery of the spacer, and means for drawing the flange and exterior hub member toward each other to bring these parts and the spoke spacing member into firm and frictional engagement with the exterior sides of the spoke ends seated in said slots.

CHARLES SCHENCK.